(12) United States Patent
Holton

(10) Patent No.: US 11,252,161 B2
(45) Date of Patent: Feb. 15, 2022

(54) PEER IDENTITY VERIFICATION

(71) Applicant: PIV Security LLC, Glenview, IL (US)

(72) Inventor: Joshua D. Holton, Glenview, IL (US)

(73) Assignee: PIV SECURITY LLC, Glenview, IL (US)

( * ) Notice: Subject to any disclaimer, the term of this patent is extended or adjusted under 35 U.S.C. 154(b) by 112 days.

(21) Appl. No.: 16/388,659

(22) Filed: Apr. 18, 2019

(65) Prior Publication Data
US 2019/0327245 A1 Oct. 24, 2019

Related U.S. Application Data

(60) Provisional application No. 62/660,099, filed on Apr. 19, 2018.

(51) Int. Cl.
| | | |
|---|---|---|
| *H04L 29/06* | (2006.01) | |
| *H04L 9/14* | (2006.01) | |
| *H04L 9/32* | (2006.01) | |

(52) U.S. Cl.
CPC .............. *H04L 63/123* (2013.01); *H04L 9/14* (2013.01); *H04L 9/32* (2013.01); *H04L 63/0442* (2013.01);
(Continued)

(58) Field of Classification Search
CPC ................... H04L 63/1441; H04L 9/14; H04L 63/12–126; H04L 63/04–045; H04L 63/06–061; H04L 9/08; H04L 9/32
See application file for complete search history.

(56) References Cited

U.S. PATENT DOCUMENTS 7,379,551 B2 * 5/2008 Chan ................... H04L 63/0442
380/286
9,083,696 B1 7/2015 Khaitan
(Continued)

FOREIGN PATENT DOCUMENTS

WO 2017/145002 A1 8/2017

OTHER PUBLICATIONS

Denning, Dorothy E., and Dennis K. Branstad. "A taxonomy for key escrow encryption systems." Communications of the ACM 39.3 (1996): 34-40. (Year: 1996).*
(Continued)

*Primary Examiner* — Madhuri R Herzog
(74) *Attorney, Agent, or Firm* — Clark Hill PLC; James R. Foley

(57) ABSTRACT

A system of peer identity verification that reduces the risk of identity theft in case of a data breach. The system does not require a vendor to maintain a database of sensitive customer-related data. Cryptographic keys are used. The system creates a one-time encryption keypair. The public and private keys of each user are saved securely on each user's device. While the public key for each user is stored remote from each user's device (such as in a cloud), the private key for a given user is not stored anywhere other than securely on that user's device. Thereafter, a user (i.e., the main user) requests another user to act as their "trusted peer" to be added to their "trust cluster." If that other user accepts the request, the main user's private key is encrypted with that other user's public key and this encrypted data gets stored remotely, such as in a cloud. Thereafter, a trusted peer is authorized and able to verify the identity of a main user by being able to decrypt and read a message encrypted with the main user's public key. The system effectively puts the recovery and protection of a main user's private key in the
(Continued)

hands of the main user's "trusted peers" in their own designed "trust cluster."

14 Claims, 14 Drawing Sheets

(52) U.S. Cl.
CPC ........ *H04L 63/061* (2013.01); *H04L 63/1441* (2013.01)

(56) References Cited

U.S. PATENT DOCUMENTS

| | | | |
|---|---|---|---|
| 9,330,245 | B2 | 5/2016 | Maron |
| 9,652,604 | B1 | 5/2017 | Johansson et al. |
| 9,853,812 | B2 * | 12/2017 | Mehta ................ H04L 63/0442 |
| 2008/0031460 | A1 * | 2/2008 | Brookner ................ H04L 9/085 380/282 |
| 2008/0307488 | A1 | 12/2008 | Hammond, II et al. |
| 2009/0210347 | A1 | 8/2009 | Sarcanin |
| 2013/0159699 | A1 | 6/2013 | Torkkel |
| 2013/0204787 | A1 | 8/2013 | Dubois |
| 2014/0244514 | A1 | 8/2014 | Rodriguez et al. |
| 2014/0279556 | A1 | 9/2014 | Priebatsch et al. |
| 2016/0204933 | A1 | 7/2016 | Ronchi et al. |
| 2017/0012959 | A1 | 1/2017 | Sierra et al. |
| 2017/0024743 | A1 | 1/2017 | Fogel et al. |
| 2017/0142082 | A1 * | 5/2017 | Qian ................... H04L 63/0442 |

OTHER PUBLICATIONS

Fouque, P-A., Guillaume Poupard, and Jacques Stern. "Recovering keys in open networks." Proceedings of the 1999 IEEE Information Theory and Communications Workshop (Cat. No. 99EX253). IEEE, 1999. (Year: 1999).*

Ege, Raimund K.; Secure Trust Management for the Android Platform; ICONS 2013: The Eighth International Conference on Systems; DeKalb, IL, USA.

Farb, Michael et al.; SafeSlinger: Easy-to-Use and Secure Public-Key Exchange; MobiCom 2013; Miami, FL, USA.

Dashlane Security White Paper; Dec. 2017.

* cited by examiner

FIG. 2
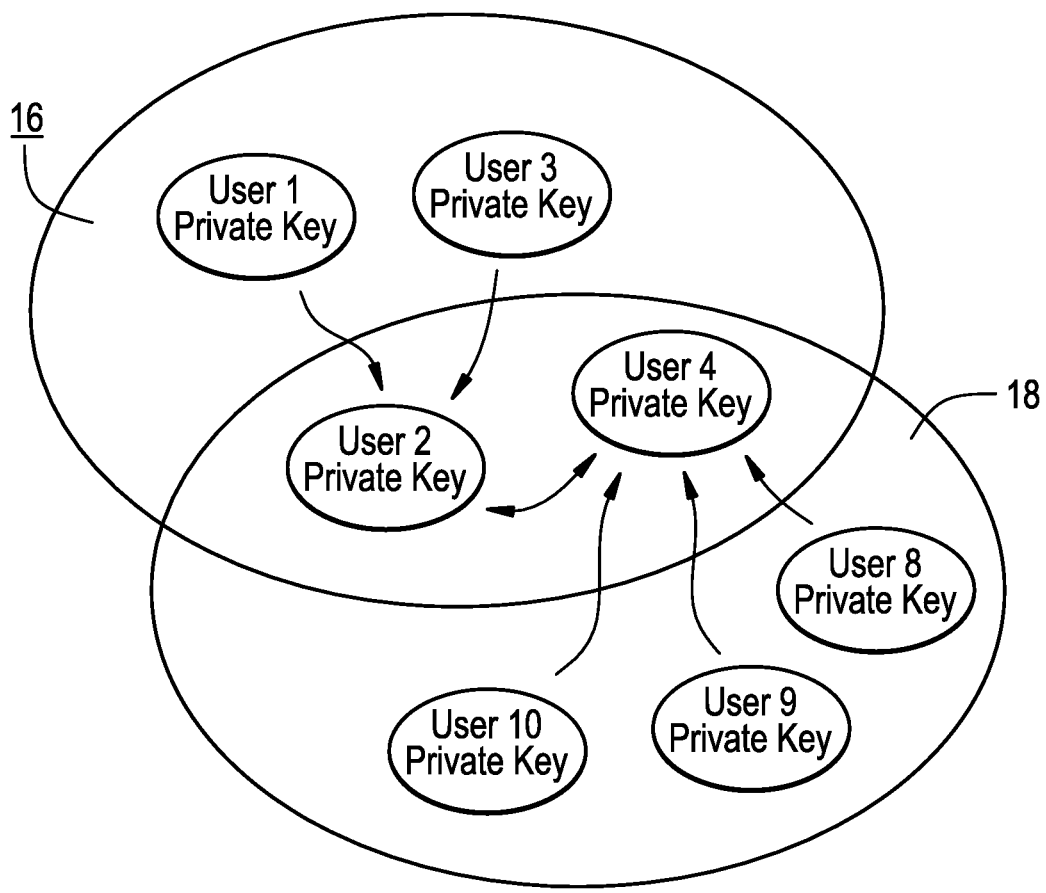
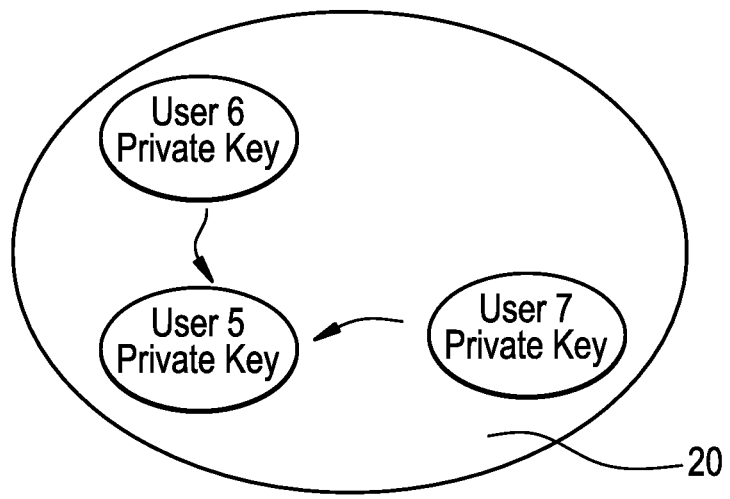

FIG. 11
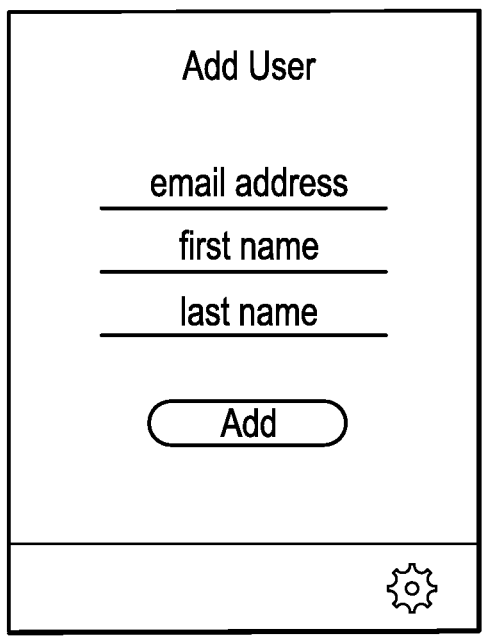
FIG. 12
FIG. 13
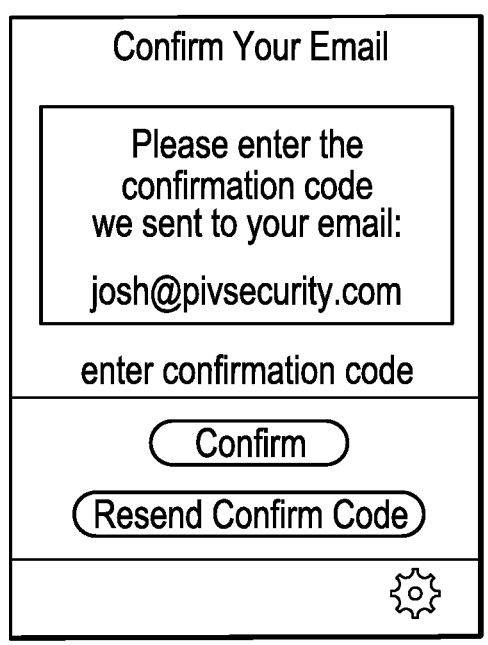

PEER IDENTITY VERIFICATION

RELATED APPLICATION (PRIORITY CLAIM)

This application claims the benefit of U.S. Provisional Application Ser. No. 62/660,099, filed Apr. 19, 2018, which is hereby incorporated herein by reference in its entirety.

BACKGROUND

The present invention generally relates to computer-implemented systems for verifying the identity of a user, and more specifically relates to a computer-implemented system for having a trusted peer in a main user-defined cluster of trusted peers verify the identity of the main user.

Currently, many vendors require customers to verify their identity by having the customer confirm certain information only known by that customer. Such information may include, but may not be limited to: a customer's social security number, mother's maiden name, and/or pre-defined answers to security questions. Security questions that are commonly used by vendors to verify a customer's identity include questions such as: What high school did you attend? What was your first pet's name? What model was your first car? In what city were you born?

In order for a vendor to be able to verify a customer's identity, the vendor must maintain a database of information (such as user names and passwords, etc.) about their customers that can be used to verify their customers' identities. In other words, the vendor maintains a database of customer information, and when having a given customer verify his or her identity, the vendor has the customer effectively confirm a portion of the information which is stored in the database.

Unfortunately, data breaches (by computer hackers) have become increasingly common. A data breach that results in a computer hacker obtaining customer-related data can subject customers to identity theft putting the customer's financial wellbeing and overall privacy at risk, as well as subjecting the vendor to substantial civil liability.

SUMMARY

An object of an embodiment of the present invention is to provide a system of peer identity verification that reduces the risk of identity theft, such as in case of a data breach or attempted use of a cloned device.

Another object of an embodiment of the present invention is to provide a system of peer identity verification which validates a customer's identity before a fraudulent transaction or the fraudulent use of the customer's data, ultimately preventing the breach or fraudulent activity from happening.

Another object of an embodiment of the present invention is to provide a system of peer identity verification that does not require a vendor to maintain a database of sensitive customer-related data.

Another object of an embodiment of the present invention is to provide a system of peer identity verification that does not require a vendor to maintain a database of unencrypted customer-related data.

Another object of an embodiment of the present invention is to provide a system of peer identity verification that does not require a vendor to store, access, or have knowledge of a user's decryption keys.

Briefly, an embodiment of the present invention provides a system of peer identity verification wherein a main user creates a cluster of trusted peers. The system uses cryptographic keys. After a cluster of one or more trusted peers is created by a main user, a trusted peer is authorized and able to verify the identity of a main user by being able to decrypt and read a message encrypted with the main user's public key. This is because in order to accomplish this, the trusted peer must be able to have access to the main user's private key (that is stored remotely in an encrypted backup message only decipherable by the trusted peer's private key and saved to the server when the peer was added to the main user's cluster of trusted peers). This "proof of trust" demonstrates that the trusted peer has access to their own locally stored private key and the main user's private key.

The system is preferably configured to back up the main user's private key by using a trusted peer's public key to encrypt the main user's private key, and then store the encrypted backup message in remote memory (such as in a cloud). Thereafter, the trusted peer's private key can be used to recover the main user's private key, i.e., by using the trusted peer's private key to decrypt the encrypted backup message containing the main user's private key.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 2 is a diagram that illustrates sample virtual identity clusters of users in the network shown in FIG. 1;

FIGS. 11-25 are cellular device screen shots relating to an embodiment of the present invention.

DESCRIPTION OF ILLUSTRATED EMBODIMENTS

Figure 1:
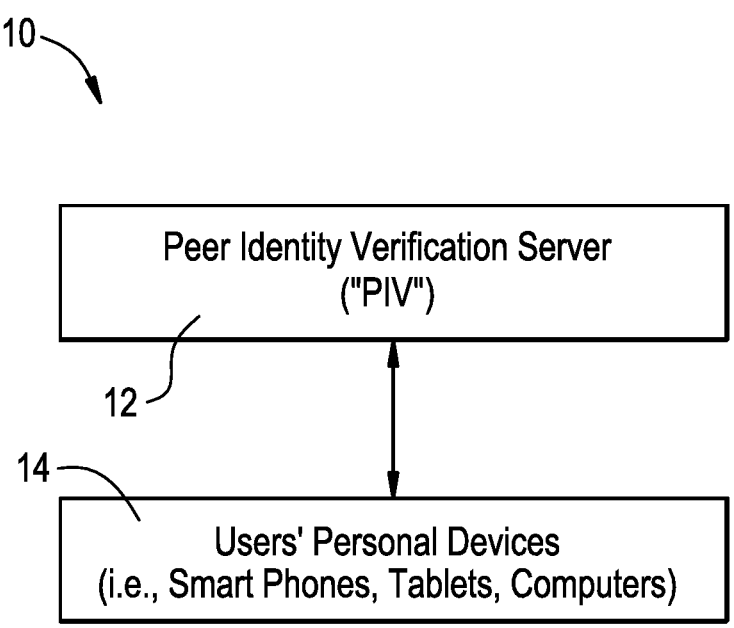
FIG. 1 is a block diagram that shows components of a network which is used to implement an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

An embodiment of the present invention provides a system of peer identity verification that reduces the risk of identity theft in case of a data breach, as a result of not requiring that a vendor maintain a database of sensitive customer-related data in order to be able to verify the identity of its customers.

As shown in FIG. 1, a system 10 in accordance with an embodiment of the present invention provides that a peer identity verification server 12 is configured to effectively communicate with a plurality of users via the users' personal devices, such as cellular devices, tablets, computers, etc. 14. The system 10 is configured such that, after users install software on their devices (such as by installing an application on their cellular device), a user can use his or her device to create a cluster (i.e., a network) of other users in the system. Preferably, once the application is installed, each time the user tries to access the application, the application performs some type of security check on the user, such as facial identification, fingerprint identification, etc.

For simplicity, the user who creates a cluster is called a "main user" relative to that particular cluster, and each of the other users who agree to be part of that same cluster is called a "trusted peer." Once a main user uses his or her device to create a cluster, the main user can effectively direct the peer identity verification server to communicate with any of the trusted peers in the cluster to verify the identity of the main user.

As such, each cluster comprises a trusted network of a single main user and at least one trusted peer. FIG. 2 shows, just as an example, a few clusters 16, 18, 20 that can be created using the system 10 shown in FIG. 1. Specifically, three clusters are shown in FIG. 2, as follows:

a first cluster 16 which consists of Users 1, 2, 3 and 4, wherein User 2 is the main user of the cluster and Users 1, 3 and 4 are trusted peers of User 2;

a second cluster 18 which consists of Users 2, 4, 8, 9 and 10, wherein User 4 is the main user of the cluster and Users 2, 8, 9 and 10 are trusted peers of User 4; and a third cluster 20 which consists of Users 5, 6, and 7, wherein User 5 is the main user of the cluster and Users 6 and 7 are trusted peers of User 5.

As shown, the system 10 is configured such that any user (such as User 2 shown in FIG. 2) can be the main user of one cluster while simultaneously being one of the trusted peers of another cluster. With regard to the sample clusters shown in FIG. 2, Users 1, 3 and/or 4 can be called upon by the peer identity verification server to verify the identity of User 2, while Users 2, 8, 9 and/or 10 can be called upon by the peer identity verification server to verify the identity of User 4. Finally, Users 6 or 7 can be called upon by the peer identity verification server to verify the identity of User 5.

Preferably, the system is configured such that once a user sets up his or her cluster of trusted peers, identity requests can be initiated by an any number of appropriate, authorized entities, such as the system itself, another user, a chain of commerce partner (i.e., a bank, credit card company, credit monitoring bureau, etc.), etc.

Generally speaking, to verify the identity of the main user of a given cluster, the system 10 uses cryptographic keys—i.e., public keys and private keys. The system 10 provides that the main user's private key is stored only on a device belonging to the main user (such as a cellular device, tablet, computer, etc.). A unique public key is stored on the peer identity verification server 12, the cloud, or on each of the devices belonging to the trusted peers in that main user's cluster. The system 10 is configured such that a trusted peer is authorized and able to verify the identity of a main user by being able to decrypt and read a message encrypted with the main user's public key. This is because in order to accomplish this, the trusted peer must be able to have access to the main user's private key (that is stored remotely in an encrypted backup message only decipherable by the trusted peer's private key and saved to the server when the peer was added to the main user's cluster of trusted peers). This "proof of trust" demonstrates that the trusted peer has access to their own locally stored private key as well as the main user's private key.

The system 10 provides that a unique encryption key pair is created locally for each main user (such as by using email), thereby establishing that main user's virtual identity. The private key is stored only on a singular mobile device of the main user. Without this private key, the user's virtual identity is unverifiable and incomplete. Subsequently, each main user sets up one or more trusted peers, creating their virtual identity cluster. Each peer connection in the cluster creates a unique link to the main user, effectively combining the main user's private key and the trusted peer's public key. This trusted cluster is thereafter used for virtual identity verification based on different rules, processes, and events.

Figure 3:
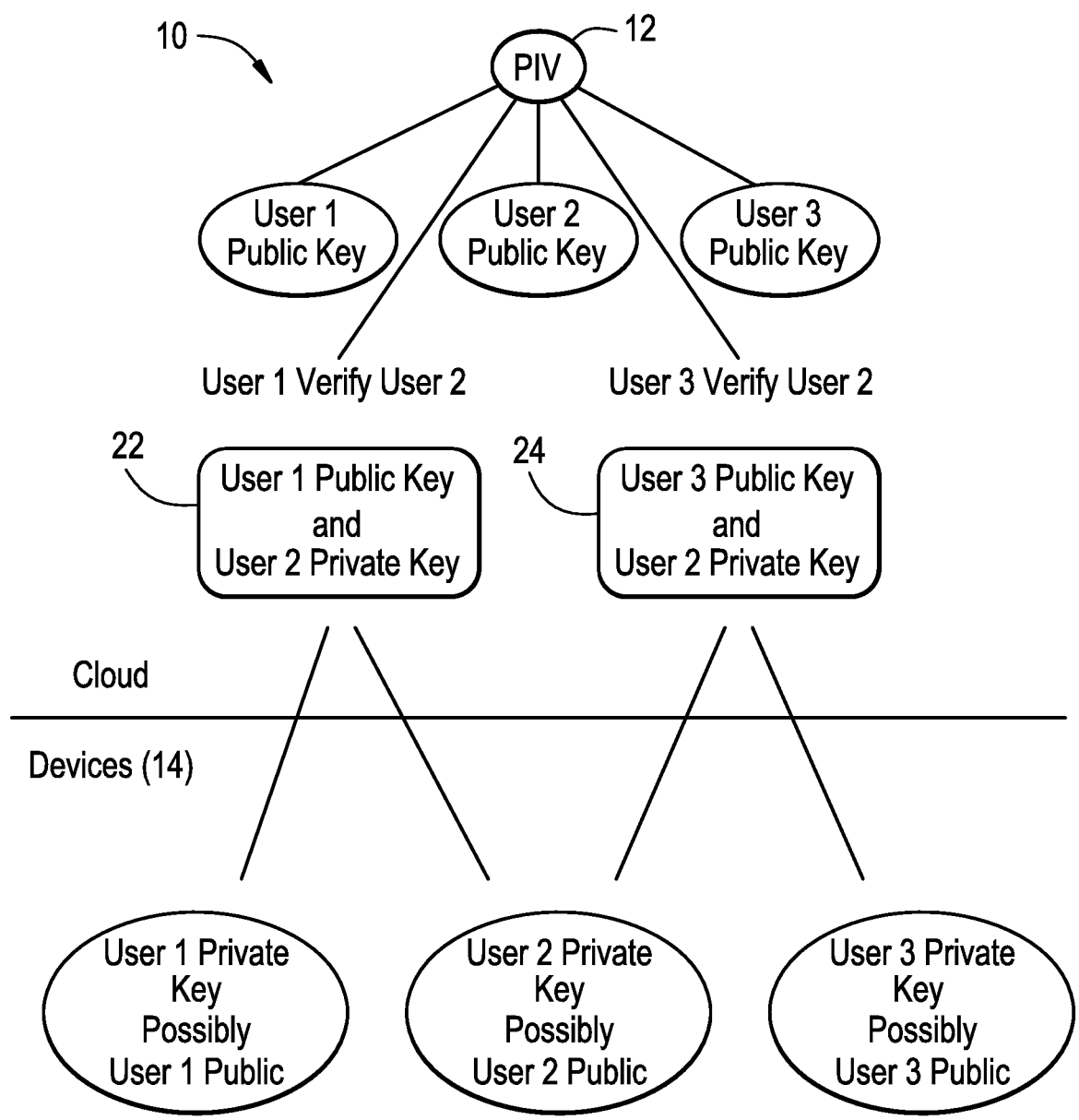
FIG. 3 is a diagram which illustrates how either one of two users (User 1 or User 3) of one of the virtual identity clusters shown in FIG. 2 can verify the identity of a main user (User 2) of that same cluster.

As discussed, the system 10 provides that the main user's private key is only stored in a deciphered state on that main user's singular mobile device. Initially, when a trusted peer joins the cluster, the peer identity verification server uses the public key of the trusted peer to encrypt the private key of the main user. The encrypted message then gets stored on the server (for example, in a cloud). This encrypted data is represented in FIG. 3 in boxes 22 and 24. Subsequently, in the case of a main user trying to recover his identity, it takes the software of the application stored on a trusted peer's device, combined with that trusted peer's private key, to decipher the encrypted message stored in the cloud to recover the main user's private key and then pass the main user's private key back to them. The "passing back" happens by the trusted peer agreeing to "verify" the main user by tapping a screen in the application, which then causes the application to decipher and recover the main user's private key and encrypt it using a temporary public key of the main user (created on their device when installing the software) and store that temporarily in the cloud until the main user's device (using the application) accesses it.

The system 10 is configured such that when a user initially creates an account, the system locally creates a device identification that is unique to that particular device and then saves that unique device identification, such as in a cloud or on the peer identity server itself. Thereafter, each time the user launches the software (such as by running the application on their cellular device), the system 10 checks to make sure the device identification matches with the one that was stored previously. This process is performed to ensure that someone else is not trying to log in from some other device purporting to be that user (i.e., a "cloned" user). If the device identification does not match, the system 10 locks the account and effectively contacts a trusted peer in that user's trusted network (i.e., cluster) in order to verify the identity of the main user.

For example, with reference to FIG. 2, if someone purporting to be User 2 tries to log in using a device that has a device identification that differs from the device identification that was stored previously, the system 10 (specifically the server 12) initiates contact with Users 1, 3 and/or 4 seeking verification that it really is User 2 trying to log in.

The system 10 is configured such that when a user initially downloads the software (such as by downloading the application on their device, such as on a cellular device), the system 10 locally creates a one-time encryption keypair—i.e., a public key and a private key. Both the public and private keys are saved securely on the user's device. While the system 10 also stores the public key remote from the user's device (such as in a cloud or on the peer identity verification server), the private key for that user is not stored anywhere other than securely on that user's device. Thereafter, the user requests another user to act as their "trusted peer" to be added to their "trust cluster." If another user accepts the request, the system 10 is configured to provide that the device of the main user encrypts the main user's private key with the "trusted peer's" public key and stores this either on the peer identity server, in the cloud or on the trusted peer's device. In other words, the system 10 stores a user's private key locally on their singular mobile device, but also backs it up, for example, in the cloud by using another "trusted" peer's keypair (where their private key is stored locally on their singular mobile device).

Thereafter, if the main user needs to reinstall/recover their software account, after confirming their email, they need to request verification from a "trusted peer". If the peer accepts to verify the main user, the peer's device retrieves the encrypted message from the cloud and decrypts it with their private key locally on their device. This gives that peer the main user's private key which the peer then encrypts with a temporary public key stored in the cloud during the main user's setup process. Once this is completed, the main user enters a code sent to their email into the application and the system responds by granting them permission to retrieve this new message from the cloud. They then decrypt the message with their temporary local private key. This gives them their original private key that can now be used to decrypt messages encrypted with their original public key. Lastly, the system discards the temporary key pair from the cloud as it is no longer needed.

For example, referring to FIG. 2, User 2 initially downloads the software (such as by downloading the application on User 2's cellular device). The system then creates a one-time encryption keypair—i.e., a public key and a private key. Both the public and private keys are saved securely on User 2's device. While the system 10 also stores the public key remote from User 2's device (such as in the cloud), the private key for User 2 is not stored anywhere other than securely on User 2's device. Thereafter, User 2 requests User 1 (for example) to act as their "trusted peer" to be added to their "trust cluster." If User 1 accepts the request, the system 10 is configured to provide that User 2's device encrypts User 2's private key with the public key of User 1, and the system 10 stores this encrypted data such as in the cloud (this encryption and storage is shown in FIG. 3, specifically on the left hand side in box 22, wherein box 24 relates to when User 3 is asked to confirm the identity of User 2). Thereafter, if User 2 needs to reinstall/recover their software account, after confirming their email, they need to request verification from a "trusted peer," such as User 1. If, for example, User 1 accepts to verify User 2, User 1's device retrieves the encrypted message from the cloud and decrypts it with User 1's private key (stored locally on User 1's device). This gives User 1 User 2's private key which User 1 then encrypts with a temporary public key that was stored in the cloud during User 2's setup process. Once this is completed, User 2 enters a code sent to their email into the application running on User 2's device, and the system responds by granting them permission to retrieve this new message from the cloud. Another implementation would be to notify User 2 to open up the application on their device, thereby automatically retrieving the new message from the cloud. User 2's device then decrypts the message with User 2's temporary local private key. This gives User 2 their original private key that can now be used to decrypt messages encrypted with their original public key. Lastly, the system discards User 2's temporary key pair from the cloud as it is no longer needed.

Figure 4:
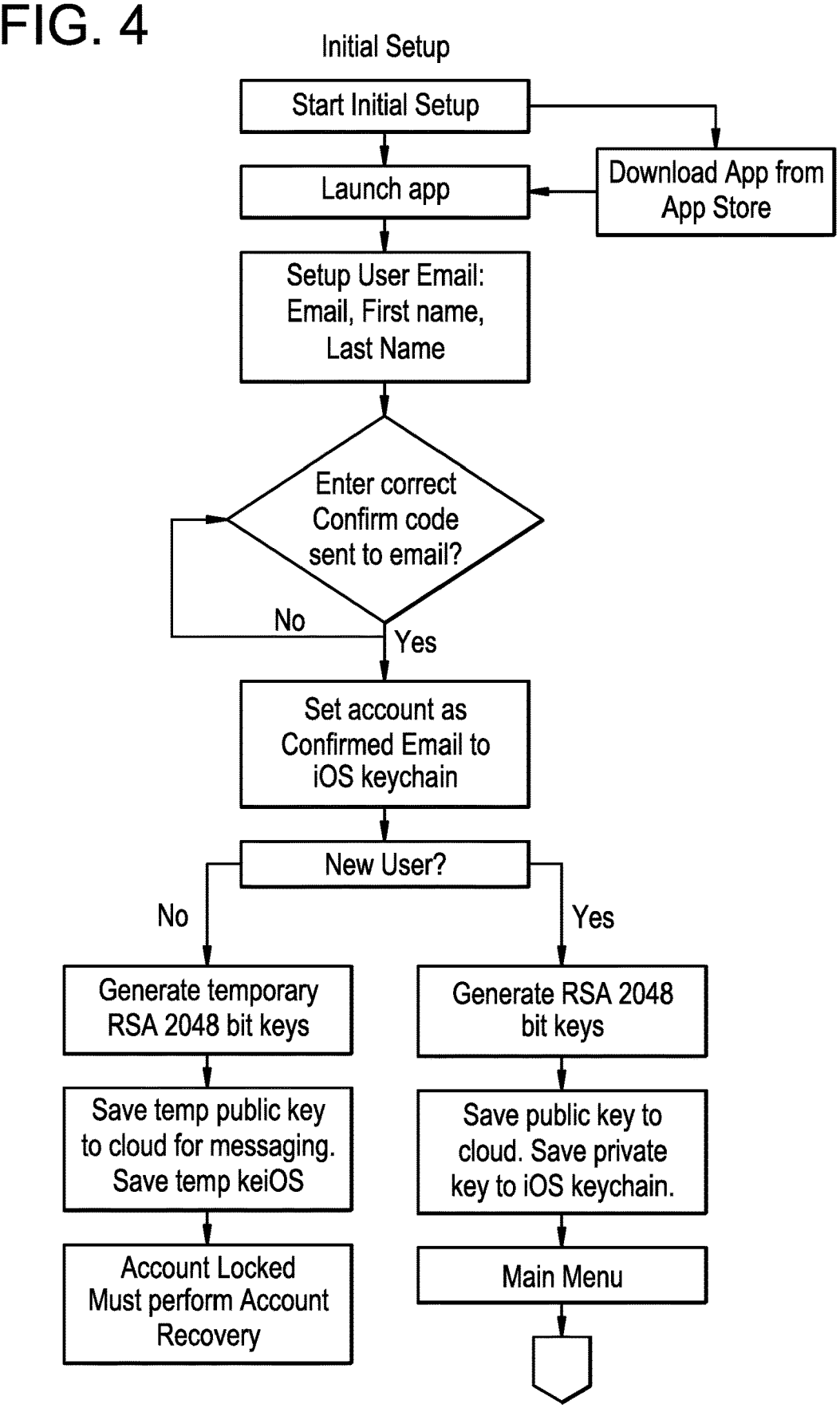
FIGS. 4-10 are flow charts that illustrate certain steps that can be conducted to implement an embodiment of the present invention.
Figure 5:
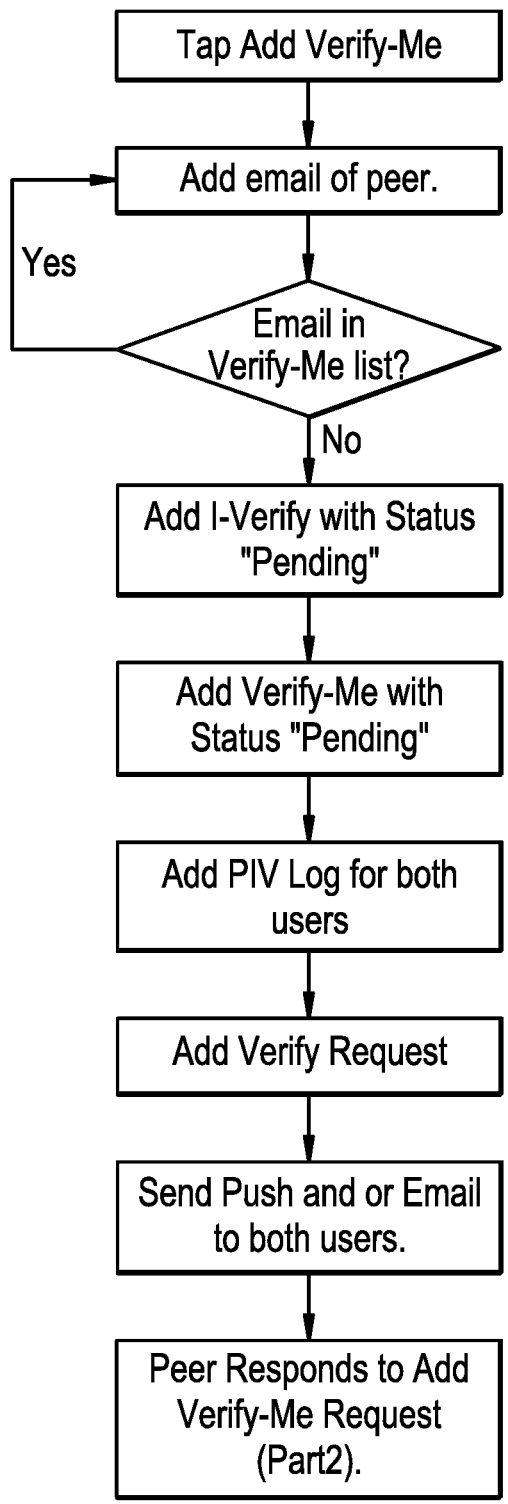
Figure 6:
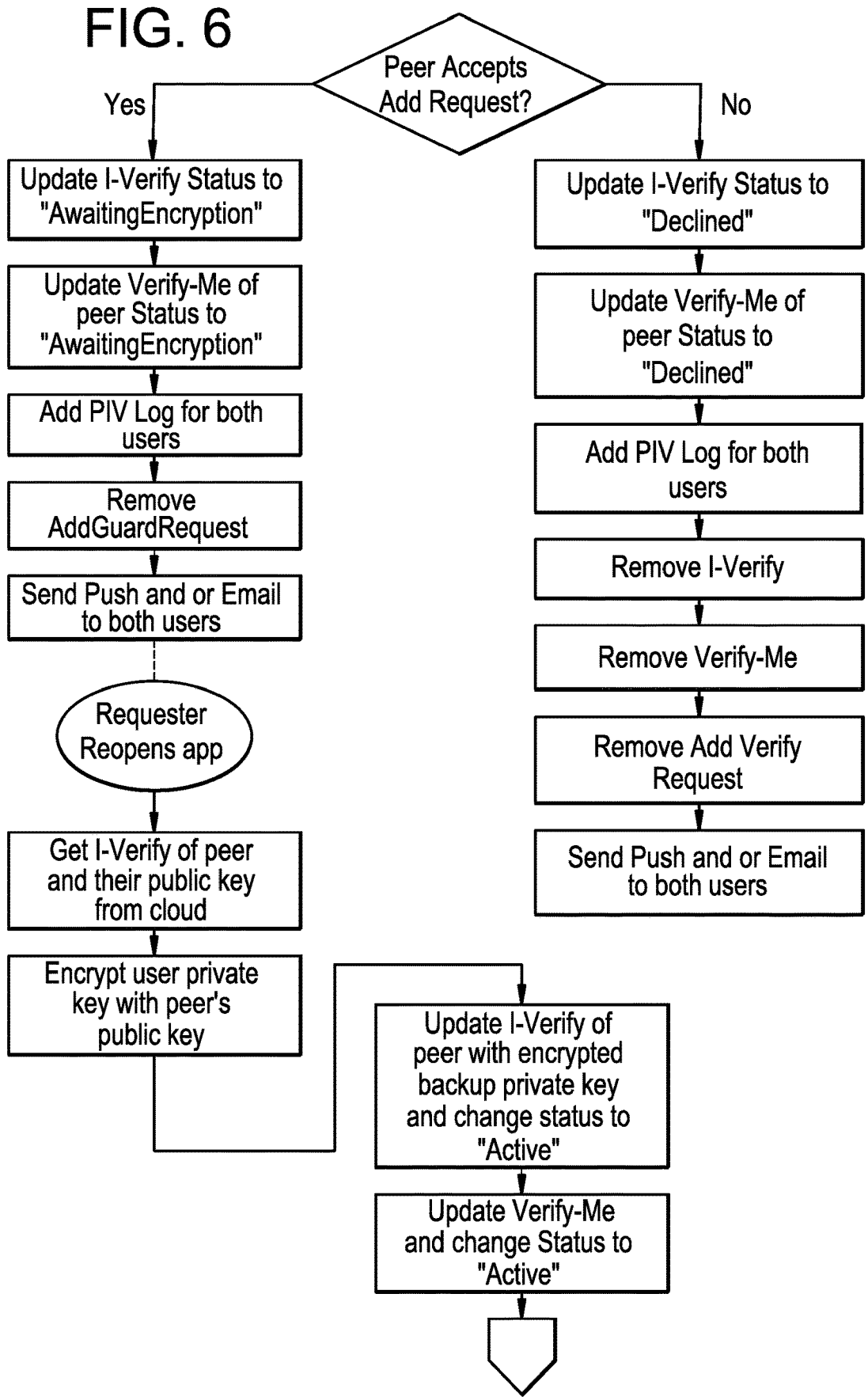
Figure 7:
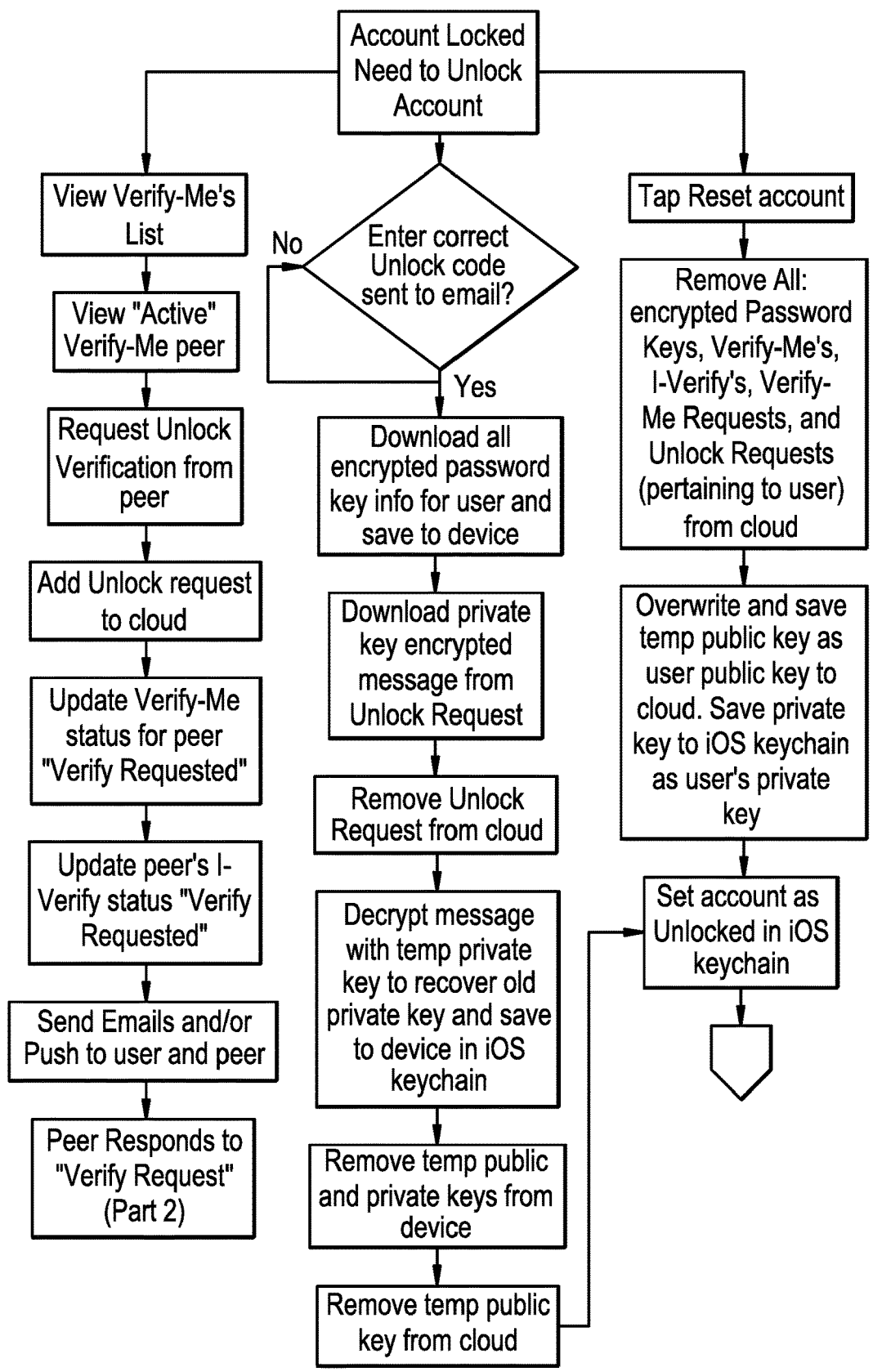
Figure 8:
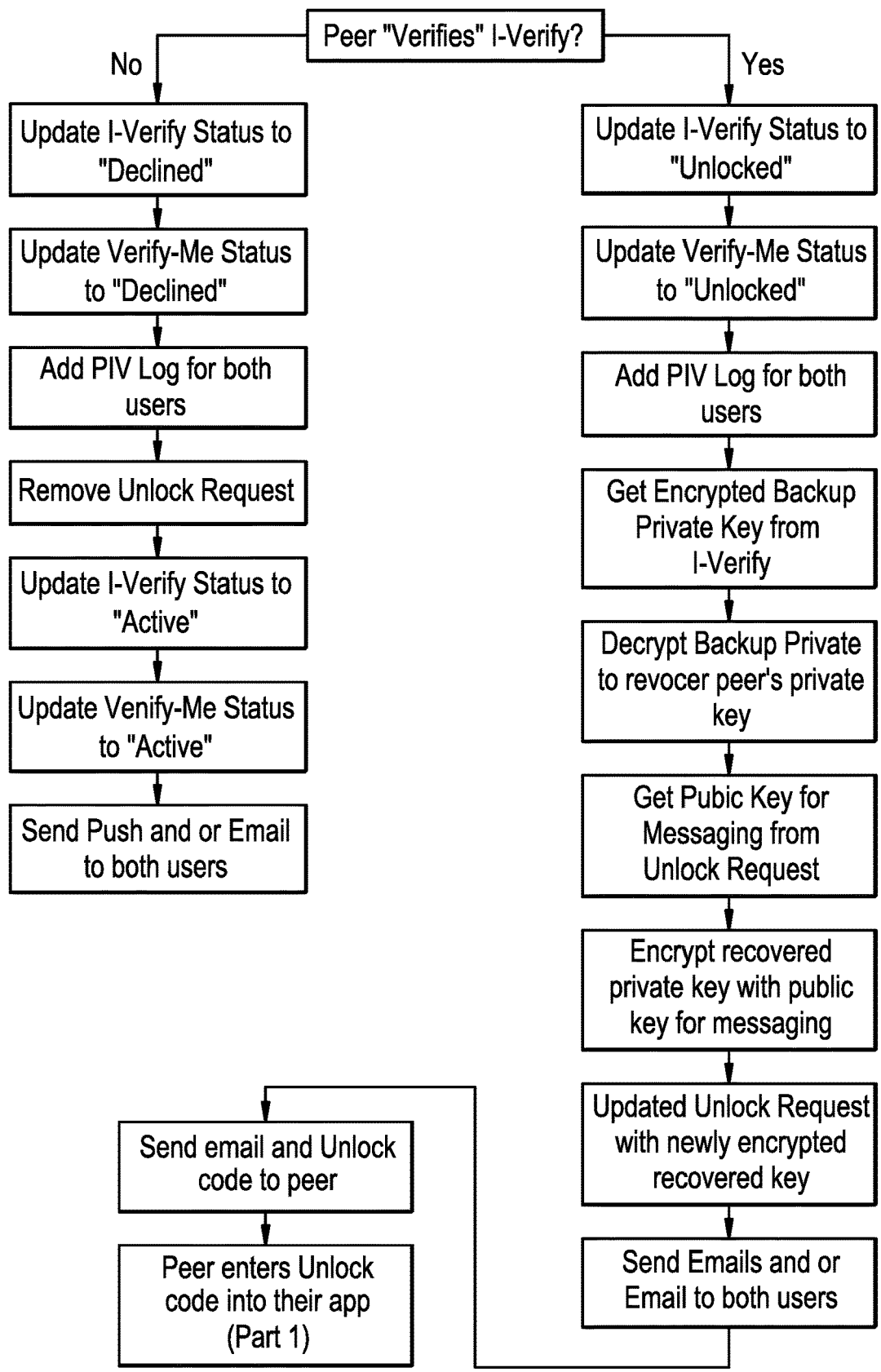
Figure 9:
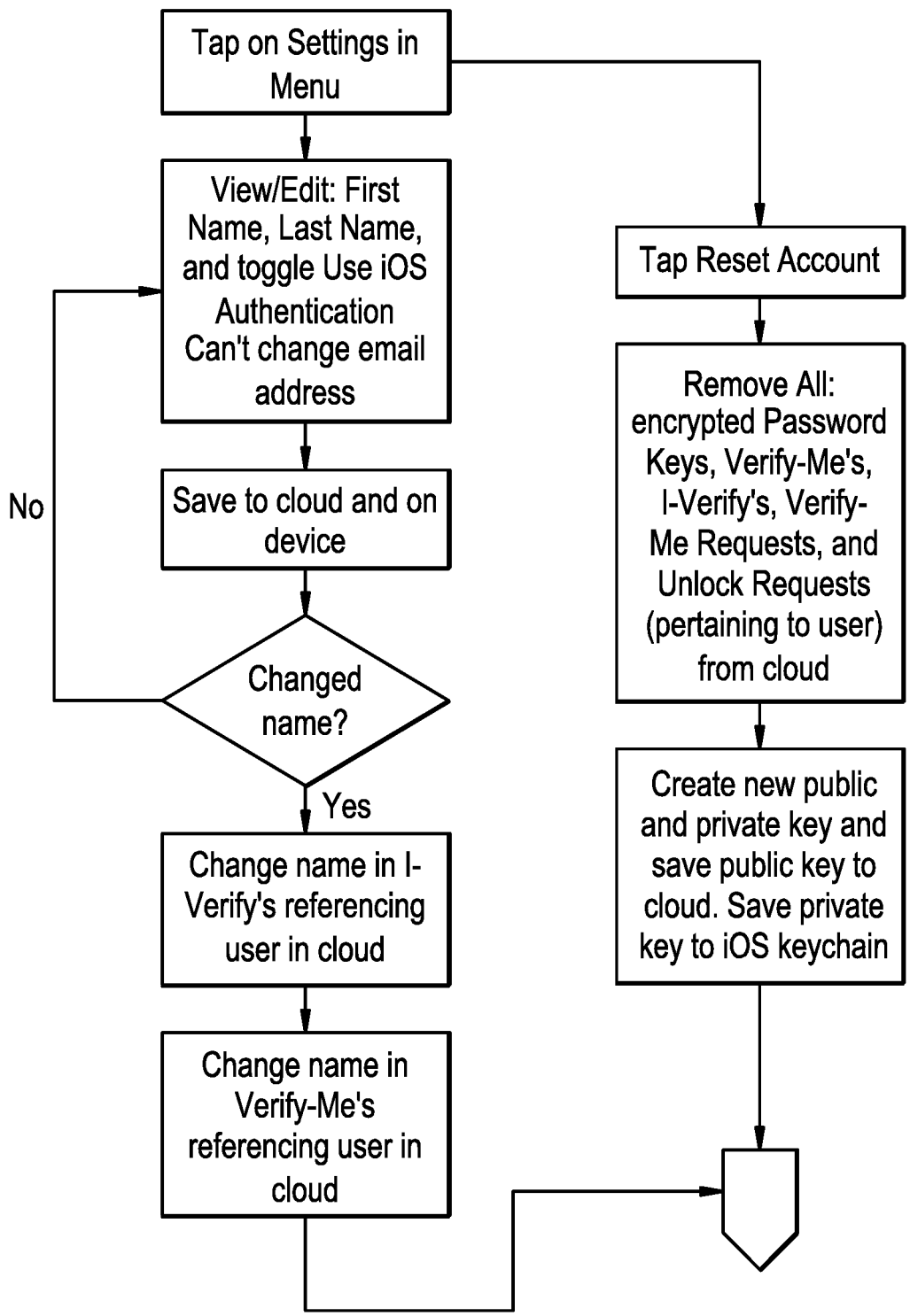
Figure 10:
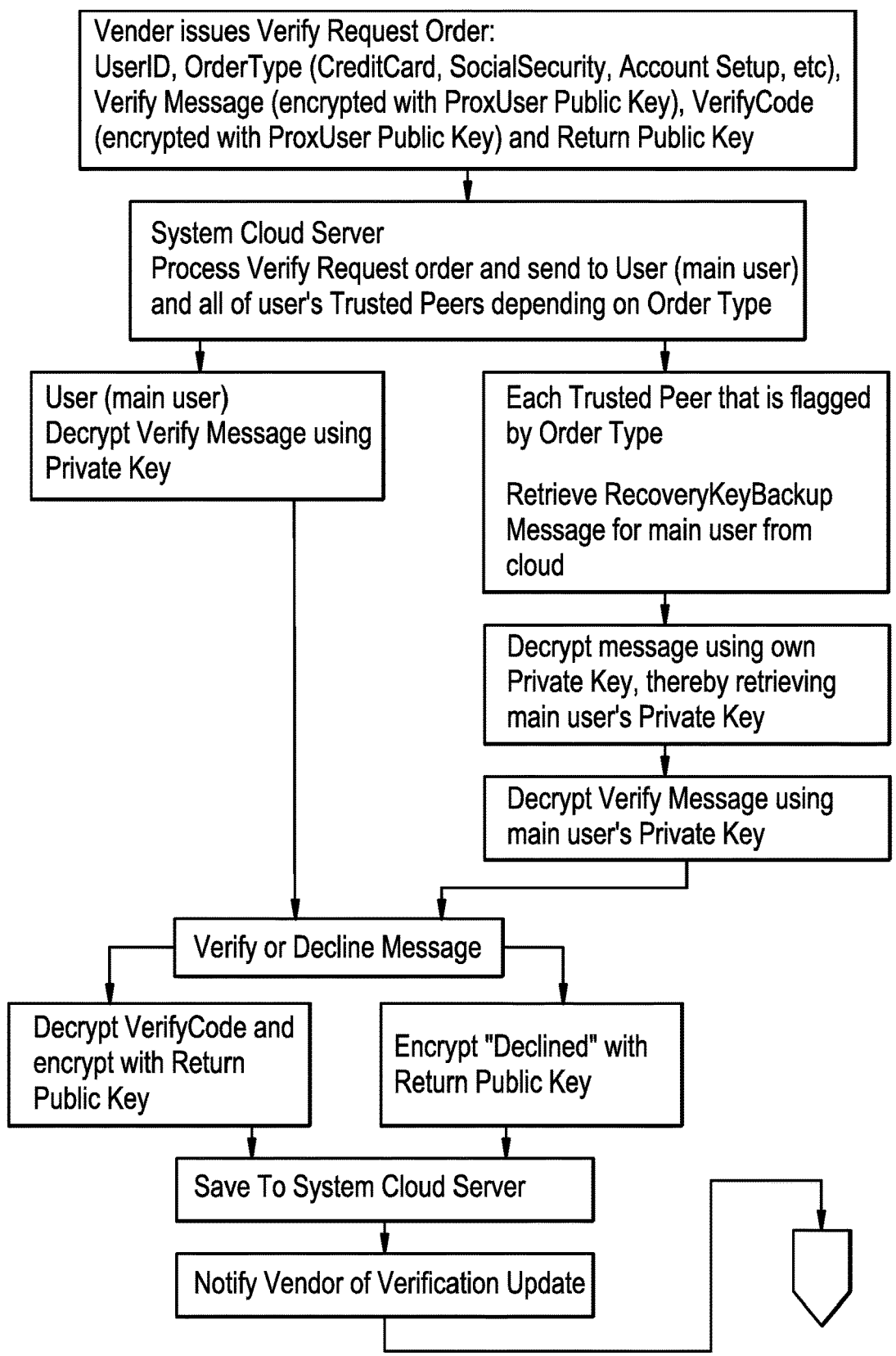

FIGS. 4-10 are flow charts relating to the system described hereinabove, and are self-explanatory. Specifically, FIG. 4 is a flow chart that relates to the initial setup by a user; FIG. 5 is a flow chart that relates to a main user setting up the ability for the system to verify the main user's identity; FIG. 6 is a flow chart that relates to a peer responding to the main user having the system ask the peer to confirm that they are willing to be added to the main user's cluster; FIG. 7 is a flow chart that relates to the first part of a recovery process; FIG. 8 is a flow chart that relates to the second part of a recovery process, during which a peer responds to a request to verify a main user's identity; FIG. 9 is a flow chart that relates to general settings; and FIG. 10 is a flow chart that relates to an outside vendor using the system to have a main user and a trusted peer verify the identity of the main user.

FIGS. 11-25 are cellular device screen shots relating to the flow charts shown in FIGS. 4-10. Specifically, FIGS. 11-13 relate to the flow chart shown in FIG. 4. FIG. 11 is a screen which allows a new user to provide his or her email address, first name and last name. FIG. 12 is a screen which shows that the system has confirmed that the user is a user of the system. FIG. 13 is a screen which allows a user to enter a confirmation code that is contained in an email received from the system.

Figure 14:
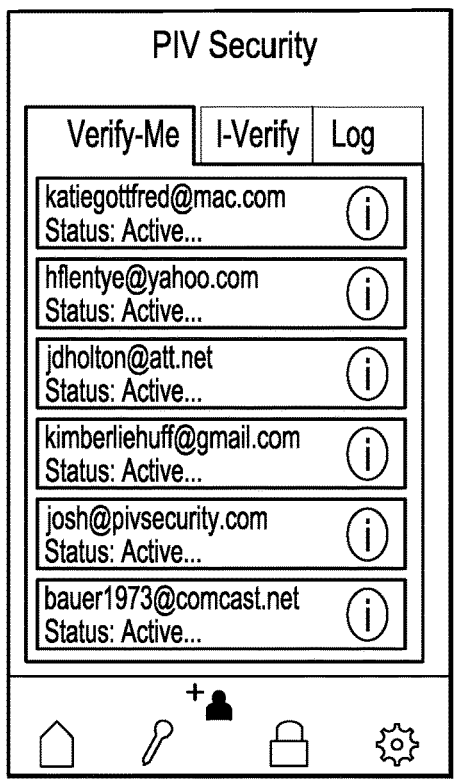
Figure 15:
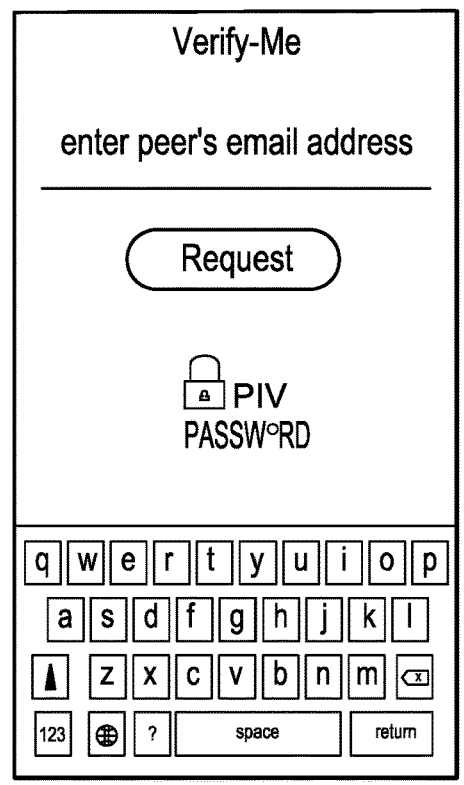

FIGS. 14-15 relate to the flow chart shown in FIG. 5. FIG. 14 shows a list of users which a main user has chosen be part of that main user's trusted network (i.e., cluster). FIG. 15 shows a screen which allows a main user to request that a peer become part of that main user's trusted network (i.e., cluster).

Figure 16:
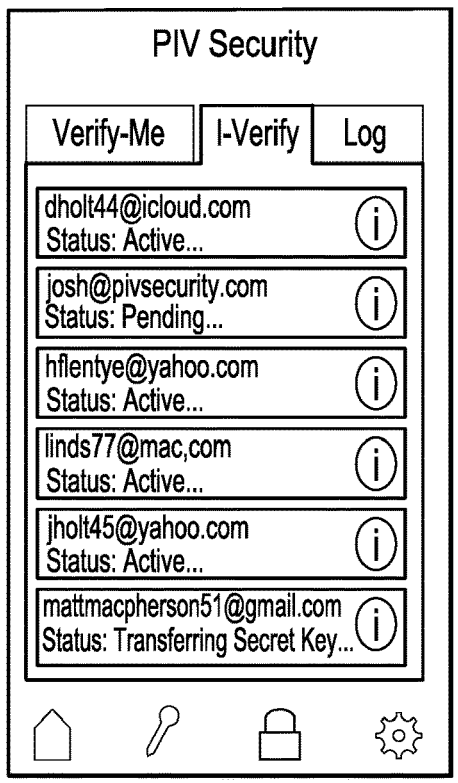
Figure 17:
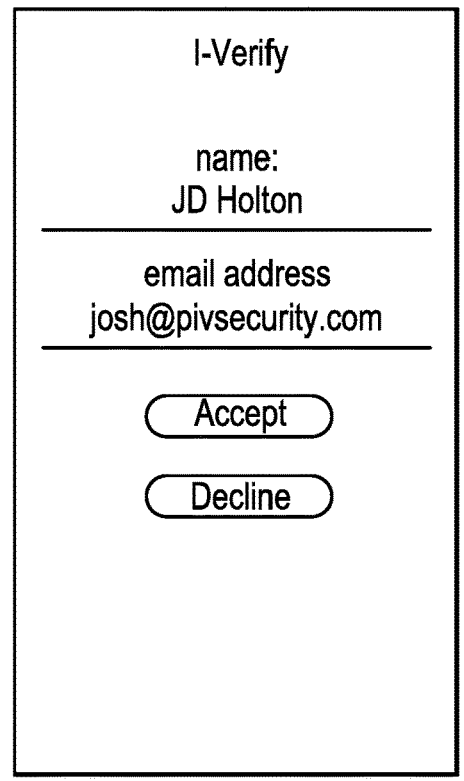

FIGS. 16-17 relate to the flow chart shown in FIG. 6. FIG. 16 shows a list of users for which the user is a trusted peer. FIG. 17 is the screen user sees when being asked whether the user is willing to be part of another user's trusted network (i.e., cluster).

Figure 18:
Figure 19:
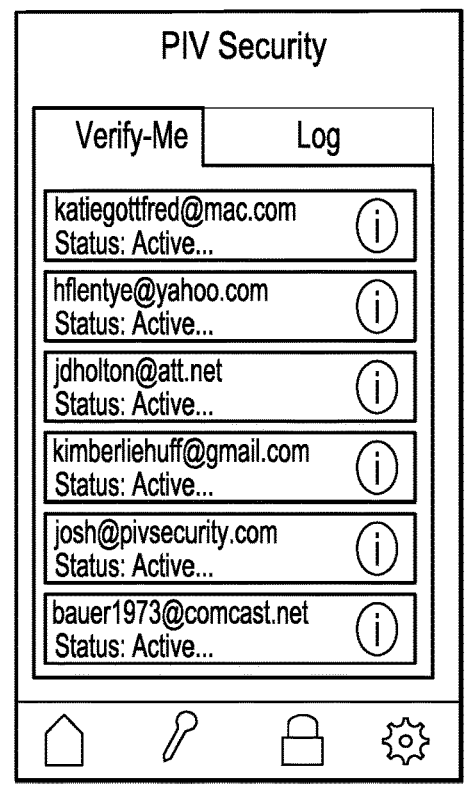
Figure 20:

FIGS. 18-20 relate to the flow chart shown in FIG. 7. FIG. 18 shows a screen where a user needs to unlock (i.e., recover) their account by entering a code sent to their email after a trusted peer verifies their identity. FIG. 19 shows a screen of a list of trusted peers which that particular user can request to verify his or her identity. FIG. 20 shows a screen where the user requests verification from the list shown in FIG. 19.

Figure 21:
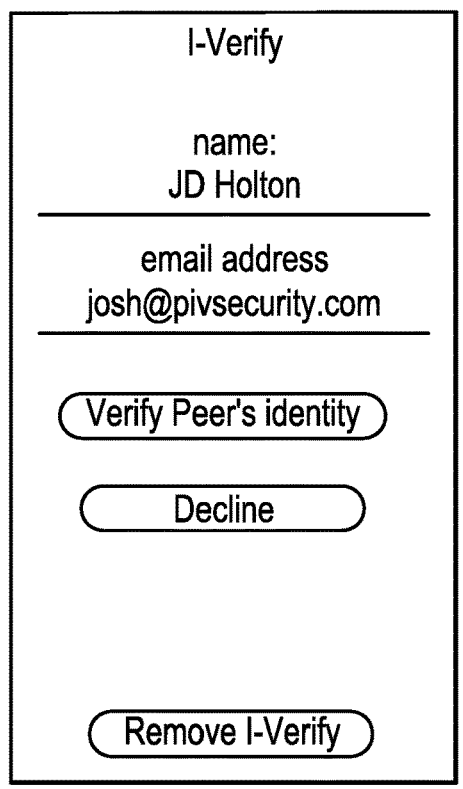

FIG. 21 relates to the flow chart shown in FIG. 8 and shows the trusted peer's screen after the main user (i.e., "JD Holton") requests verification for account recovery in FIG. 20.

Figure 22:
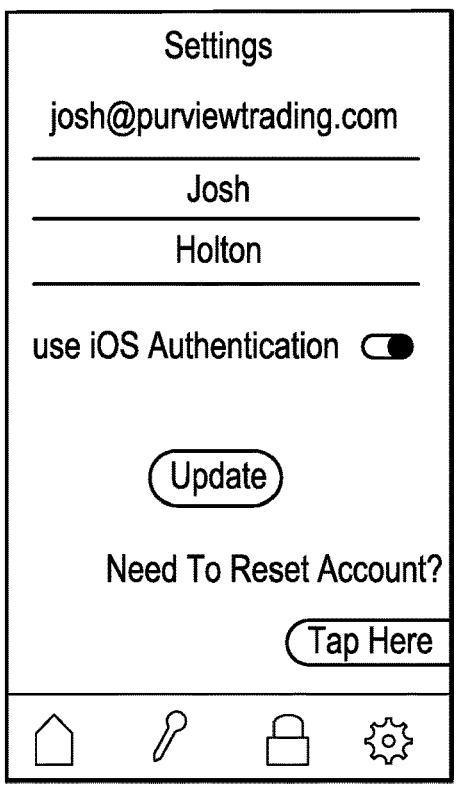

FIG. 22 relates to the flow chart shown in FIG. 9 and shows the application's general settings screen.

Figure 23:
Figure 24:
Figure 25:

FIGS. 23-25 relate to the flow chart shown in FIG. 10. FIG. 23 shows a sample list screen of an active end-to-end encryption message from a vendor (i.e., Chase) to the user and/or a trusted peer requesting verification. FIG. 24 shows the screen of the decrypted message from the vendor and where the user verifies or declines the massage question. FIG. 25 shows a screen of the sample message from the vendor after it has been answered by the user and is store in the Log shown in FIG. 23.

Although several sample screen shots are shown in FIGS. 11-25, the application which is part of the system can be configured to provide less screens, more screens, very different looking screens, etc. while still staying very much within the scope of the present invention.

As discussed above, the system 10 includes a peer identity verification server 12. Preferably, the server 12 is configured in two portions: a remote storage database and a system that assists in processes initiated by the user. Some information stored on the server includes: general account information (user name, email, public key, device identification, device token, etc.), list of trusted peers of a main user, list of users that a user is a trusted peer for, encrypted messages needed for verification and/or recovery, messages to inform a user of account activities and changes, and logs of past user activities. The system portion of the server 12 is preferably configured to perform tasks such as: generating confirm codes used for a user to verify their email during setup; generating recovery codes for a user to access encrypted messages used in the account recovery process; and sending messages (via email, push notifications, and texts) to users informing of account activities, requests, and changes.

Regarding the application that is also part of the system 10 and which is installable onto the users' devices, such as on mobile devices, preferably the application is configured such that once the application is installed on a mobile device, the application performs many tasks and processes locally and then saves to the server. Most importantly, during account setup, the application generates an encryption keypair and saves the public key remotely and the keypair (public and private keys) locally. This keypair acts as a user's virtual identity. Storing the private key locally ensures the server will never have access to the user's private key. The application is also preferably configured that that a user can accomplish the following within the application: requesting other users to act as trusted peers; answering requests from other users to act as a trusted peer for them; modifying the user's trust peer cluster; removing oneself from another user's trusted peer cluster; and resetting the user's account.

Preferably, the application is also configured such that when a user "agrees" to act as a trusted peer of another user (i.e., the main user), the main user's application creates an encrypted backup message by encrypting their private key with the trusted peer's public key. This message is then saved on the server to be used for account recovery and identity verification tasks. After this handshake is completed, a trusted peer's application will now be able to verify and assist a main user in recovering their private key, if needed. Along with the main user, the trusted peer's application is also preferably able to decrypt and view identity verification messages sent with the main user's public key and verify or decline the message contents.

With much of the processing and all of the cryptographic tasks happening locally on the user's mobile device, this creates a zero-knowledge architecture on the server 12. Since the private key of a user is stored locally, all tasks involving decrypting backup messages and verification messages happen locally. This software solution leverages a main user and their trusted peers' singular mobile devices, thereby turning trusted peers into de facto "gatekeepers" of the main user's virtual identity. This prevents any backdoors on the server to recover or obtain a user's virtual identity (i.e., their public/private keypair).

The system disclosed herein effectively removes the need for the server or business entity from ever being needed to store or have access to a user's private key. Instead, the system puts the recovery and protection of a main user's private key in the hands of the main user's "trusted peers" in their own designed "trust cluster." This is effectively illustrated in the flow chart shown in FIG. 10, wherein a vendor effectively employs the system to verify a customer's identity, wherein the customer is a main user of the system and the main user's trusted peer cluster, along with the main user, is being used to verify the identity of the main user.

An embodiment of the present invention eliminates the need for vendors to store decryption keys for the user. Instead, an embodiment of the present invention creates opportunities for the vendor to have all sensitive user data encrypted and only decipherable by the user's own decryption key, thereby protecting user data from server-side hacking. In other words, even if a hacker were to hack into the vendor's server, the sensitive customer-related data that could be obtained would not be decipherable without the users' decryption keys.

The system provides a self-created and controlled independent cluster of unique devices (assuming one device per unique peer), consisting of a main user and his or her trusted peers. Each cluster communicates directly and independently with the peer identity verification server. The system provides that each cluster effectively backs up and is used to protect the main user's virtual identity. This structure, in conjunction with service providers, allows each main user to control his or her own virtual identity, and verification of that virtual identity, with the assistance of one or more trusted peers in the cluster.

The system described herein can be utilized (or inserted) in any process that requires verification of a user's identity. Arguably, utilizing identification clusters (i.e., trusted networks) that use unique and independent device identifications for authentication and verification can (and should be) the new standard to verify a user's identity and transaction intent.

The system described herein removes the need for a vendor to store unencrypted sensitive user data. This gives the vendor zero-knowledge architecture by allowing them to encrypt user data and eliminates the need for them to have access to a user's decryption keys.

The system described herein provides for having a user and their trusted peer cluster verify messages from an outside vendor using end-to-end encryption (wherein the vendor encrypts the message with main user's public key).

The system described herein provides for allowing vendors to store a user's decryption key for their service in this system. In this strategy, the application accesses that private key of the vendor application (i.e., by decrypting it in the same manner as is done for trusted peers private keys) and passes it back to the vendor by encrypting with AES encryption with a temporary password generated by this application (and unknown to the vendor) to be entered into the vendors software by the user. This type of application can be used in connection with medical records, sensitive documents, password applications, etc.

Potential uses of the system described herein include, but are not limited to:

1. Every time the social security number of a main user is used to open an account, apply for credit, etc. the system initiates a process wherein a notification is sent to the device of the main user and to at least one separate device belonging to a trusted peer, completely independent with no attachment or connection to any of the main user's personal information such as the main user's name, emails, previously set up usernames, social security name, birthdate, mother's maiden name, etc. The main user's device and the device of a trusted peer can then validate if this is something the main user initiated and wants to approve.

2. Recovering a main user's account names and or passwords for any login or account through the main user's own trust network, taking that responsibility and risk away from organizations, further limiting the main user's personal data and attributes from being stored and used by third parties.

3. Making a large purchase on a main user's credit card or transferring money out of a main user's existing account triggers the main user's peer identity verification account and sends notifications to the main user and trusted peers in the cluster based on event rules pre-established by, and only known by, the main user. The transaction will not be approved until the main user and a trusted peer in the cluster verify that it was really the main user who initiated the transaction. This is effected through the peer identity verification application and protocols embedded in approved partners (i.e., banks, etc.).

4. Removing the need for a static "Master Password" for third party vendor solutions. The system disclosed herein could be used to store third party application decryption keys and then pass back to users when logging into these applications (i.e. password software solutions like Dashlane and 1Password). This also adds enhanced security to similar strategies like RSA SecurID. The system could be configured to use Advanced Encryption Standard (AES) encryption to take a third party application's decryption key and encrypt it with a random generated password created and displayed only on the user's singular mobile device. Thus, when the user enters this password during login, they regain their decryption key by successfully deciphering the AES encrypted message created by this system.

5. General data recovery, document access, document transfer (i.e., sensitive medical information, legal documents, etc.).

6. Recovering and or reestablishing a main user's virtual identity.

While specific embodiments of the invention have been shown and described, it is envisioned that those skilled in the art may devise various modifications without departing from the spirit and scope of the present invention.

What is claimed is:

1. A computer-implemented system of having a human being use a device belonging to the human being to verify an identity of a main user, said human being comprising at least one trusted peer, said system comprising:
at least one cluster comprising the main user and the at least one trusted peer, wherein the system has the device display information about the main user to the at least one trusted peer and has the the at least one trusted peer use the device to view the information and confirm the identity of the main user,
wherein after the at least one trusted peer uses the device to confirm the identity of the main user, the device verifies the identity of the main user by using a private key of the trusted peer to decipher an encrypted backup message to obtain a private key of the main user, and then uses the private key of the main user to decrypt and read a message encrypted previously with a public key of the main user.

2. A computer-implemented system as recited in claim 1, wherein the system provides that the at least one trusted peer has access to the private key of the main user as well as has access to a private key relating to said at least one trusted peer.

3. A computer-implemented system as recited in claim 2, wherein the system backs up the private key of the main user by using a public key of said at least one trusted peer to encrypt the private key of the main user, and stores the encrypted private key of the main user as an encrypted backup message in remote memory.

4. A computer-implemented system as recited in claim 3, wherein the system uses the private key of the at least one trusted peer to recover the private key of the main user, wherein recovering the private key of the main user comprises using the private key of the at least one trusted peer to decrypt the encrypted backup message containing the private key of the main user.

5. A computer-implemented system as recited in claim 1, wherein the system is configured such that after the main user and the at least one trusted peer install software on their respective devices, the main user uses a device of the main user to create the cluster.

6. A computer-implemented system as recited in claim 1, wherein the at least one trusted peer comprises a plurality of trusted peers, further comprising peer identity verification server, wherein the system is configured such that once the main user uses the main user's device to create the cluster, the peer identity verification server is configured to communicate with any of the plurality of trusted peers in the cluster to verify the identity of the main user.

7. A computer-implemented system as recited in claim 1, wherein the system is configured such that a unique encryption key pair comprising a public key and a private key is created locally on a mobile device of the main user for each main user, thereby establishing that main user's virtual identity, wherein an unencrypted version of the private key is stored only on the mobile device of the main user.

8. A computer-implemented system as recited in claim 7, wherein the system is configured such that without the private key of the main user, the main user's virtual identity is unverifiable and incomplete.

9. A computer-implemented system as recited in claim 1, wherein the system is configured such that there are a plurality of main users, one main user per cluster, and the system is configured to provide that each main user sets up one or more trusted peers, creating their virtual identity cluster.

10. A computer-implemented system as recited in claim 9, wherein the system is configured such that each trusted peer connection in the cluster creates a unique link to the main user, effectively combining the main user's private key and the trusted peer's public key, wherein the system provides that the cluster is thereafter used for virtual identity verification.

11. A computer-implemented system as recited in claim 1, wherein the system is configured such that when any of the main user and the at least one trusted peer initially downloads software using their respective device, the system locally creates a one-time encryption keypair on the respective device, said keypair comprising a public key and a private key, wherein both the public key and private key are saved securely on on the respective device, wherein the system also stores the public key remote from the respective device, but does not store an unencrypted version of the private key anywhere else.

12. A computer-implemented system as recited in claim 1, wherein the system is configured such that when the main user transmits a request to a second user to act as the main user's trusted peer, and when the second user accepts the request, the system is configured to provide that the device of the main user encrypts the main user's private key with the second user's public key and stores an encrypted version of the main user's private key, wherein the system is configured such that if the second user accepts to verify the main user, the second user's device retrieves the encrypted version of the main user's private key and decrypts it with a private key corresponding the second user's public key.

13. A computer-implemented system as recited in claim 1, wherein the system provides that the private key of the main user is stored remotely in an encrypted backup message decipherable using a private key of said at least one trusted peer, wherein the system stores the encrypted backup message when the at least one trusted peer is added to the cluster.

14. A computer-implemented system as recited in claim 1, wherein the system provides that after the device verifies the identity of the main user by using the private key of the main user to decrypt and read a message, the device sends the private key of the main user to the main user.

* * * * *